United States Patent Office 3,737,298
Patented June 5, 1973

3,737,298
2-FLUORO-3-PHENYL-2-CYCLOBUTENONE AS PLANT AUXIN
Max Jae Fielding, Wilmington, Del., assignor to E. I. du Pont de Nemours and Company, Wilmington, Del.
No Drawing. Filed June 4, 1971, Ser. No. 150,175
Int. Cl. A01n 21/02
U.S. Cl. 71—77                                      13 Claims

ABSTRACT OF THE DISCLOSURE 2-fluoro-3-phenyl-2-cyclobutenone is useful as a plant auxin and in particular increases yield in agricultural plants.

BACKGROUND OF THE INVENTION

This invention relates to the regulation of plant growth, in particular to the stimulation of plant growth by the action of 2-fluoro-3-phenyl-2-cyclobutenone.

It has been found, in accordance with the present invention, that the growth of plants is stimulated by applying a physiologically effective amount of 2-fluoro-3-phenyl-2-cyclobutenone. Stimulation of plant growth, particularly from the standpoint of increasing agricultural productivity, is considered highly desirable.

SUMMARY OF THE INVENTION

The invention is defined in its broader aspects as the method of stimulating plant growth which comprises applying a physiologically effective amount of a compound 2-fluoro-3-phenyl-2-cyclobutenone, to the locus of the plant to be stimulated. The compound can be applied preemergence in soil, directly to the foliage of the growing plant, to plant seeds, or to cuttings to enhance root formation. In this invention the above compound is used as a plant auxin.

In a preferred method the compound is applied to agricultural plants to increase productivity among the plants. Included in the specific applications are cucumbers, tomatoes, corn, soybean, apple twigs, and grape vines.

The activity of the present plant growth stimulant is evidenced by such effects as increased height of the plants, increased lengths of internodes, enhancement of root formation, increase flowering, increase in fruit number and size and increase in yields.

DETAILED DESCRIPTION

There are a number of methods that are used for applying the effective compound depending on the intended use, the form of application and the concentration of the active ingredient in the formulation. Seed treatment, soil treatment and foliar sprays are among the most convenient methods and these are the ones most commonly used.

As a seed treatment the typical powdered solid carriers such as the various mineral silicates and clays may be used. The amount of chemical coated on the seed varies from 1 to 100 grams per hundred kilograms of seeds depending on the crop species. As a soil treatment the chemical is applied as a preplant incorporated or preemergence application at rates of 0.1 to 20 kilograms per hectare. As a foliar treatment the chemical is applied to growing plants at rates of 0.1 to 20 kilograms per hectare.

Such applications are generally applied as a dust, or as an aqueous spray containing a surface active dispersing agent. The chemical may also be applied at low concentrations from 0.1 to 5 percent for application to plant parts such as cuttings to stimulate root formation. To stimulate growth the chemical may also be applied to the soil by irrigation or in fertilizers or in combination with other pesticides.

The following examples state and illustrate the beneficial use of the compound disclosed in this invention.

Preparation of active compound

Silversmith et al. J.A.C.S. 80 5840 (1958) discloses the preparation of 2-fluoro-3-phenyl-2-cyclobutenone by the following route:

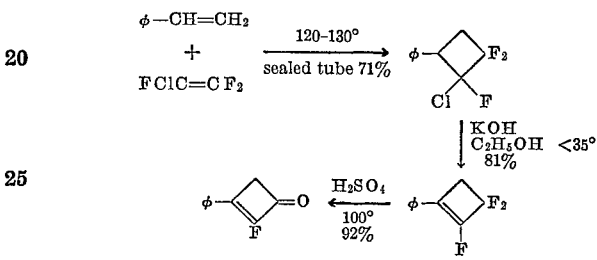

Compositions

Compositions of this invention are formulated by mixing the active compound with one or more surface active agents.

The surface active agents used in this invention can be wetting, dispersing or emulsifying agents. They may act as wetting agents for wettable powders and dusts, as dispersing agents for wettable powders and suspensions and as emulsifying agents for emulsifiable concentrates. Surfactants also enhance the biological activity of the compounds of this invention. Such surface active agents can include such anionic, cationic and nonionic agents as have heretofore been generally employed in plant control compositions of similar types. Suitable surface active agents are set out, for example, in "Detergents and Emulsifiers Annual—1968" by John W. McCutcheon, Inc. Other surface active agents not listed by McCutcheon but still effective dispersants by virtue of protective colloid action include methylcellulose, polyvinyl alcohol, hydroxyethylcellulose, and alkyl substituted polyvinyl pyrrolidones.

Suitable surface active agents for use in compositions of this invention include polyethylene glycol esters with fatty and rosin acids, polyethylene glycol ethers with alkyl phenols or with long-chain aliphatic alcohols, polyethylene glycol ethers with sorbitan fatty acid esters, and polyoxyethylenethio ethers. Other suitable surfactants include amine, alkali and alkaline earth salts of alkylaryl sulfonic acids, amine, alkali and alkaline earth fatty alcohol sulfates, dialkyl esters of alkali metal sulfonsuccinates, fatty acid esters of amine, alkali and alkaline earth isethionates and taurates, amine, alkali and alkaline earth salts of lignin sulfonic acids, methylated or hydroxyethylated cellulose, polyvinyl alcohols, alkyl substituted polyvinylpyrrolidone, amine, alkali and alkaline earth salts of polymerized alkylnaphthalene sulfonic acids, and long-chain quaternary ammonium compounds. Anionic and nonionic surface active agents are preferred.

Among preferred wetting agents are sodium alkylnaphthalene sulfonates, sodium dioctylsulfosuccinate, sodium dodecylbenzene sulfonate, ethylene oxide condensates with alkylated phenols such as octyl, nonyl and dodecyl phenol, sodium lauryl sulfate, and trimethylnonyl polyethylene glycols. Among preferred dispersing agents are sodium, calcium and magnesium lignin sulfonates, low viscosity methylcellulose, low-viscosity polyvinyl alcohol, alkylated polyvinylpyrrolidone, polymerized alkylnaphthalene sulfonates, sodium N-oleyl or N-lauroyl isethionates, sodium N-methyl-N-palmitoyl taurate and dodecyl phenol polyethylene glycol esters.

Among preferred emulsifying agents are ethylene oxide adducts of lauric, oleic, palmitic or stearic acid esters of sorbitan or sorbitol, polyethylene glycol ester with lauric, oleic, palmitic, stearic or rosin acids, oil-soluble alkylarylsulfonates, oil-soluble polyoxyethylene ethers with octyl, nonyl and dodecylphenol, polyoxyethylene adducts to long-chain mercaptans, and mixtures of these surfactants.

Compositions of this invention wil contain, in addition to surface active agents, solid or liquid diluents to produce wettable powders, dusts, granules, aqueous suspensions, or emulsifiable liquids as desired.

(A) Wettable Powders

Wettable powders are compositions which usually contain inert solid diluents in addition to surfactants. These inert diluents may serve several purposes. They can act as grinding aids to prevent mill smear and screen blinding, they can aid rapid dispersion of the mix when placed in water, they can absorb liquid or low melting solid active material to produce a free flowing solid product, they can prevent agglomeration into lumps upon prolonged hot storage and they can permit preparation of compositions with a controlled amount of active ingredient so that the proper dosage is easily measured by the consumer.

Suitable diluents may be either inorganic or organic in origin. These include the natural clays, diatomaceous earths, synthetic mineral fillers derived from silica or silicates, insoluble salts produced by precipitation in fluffy form such as tricalcium phosphate, and powdered organic diluents such as certain wood flours or corn cob flour. Preferred fillers for the compositions of this invention include attapulgite clay, nonswelling calcium magnesium montmorillonites, synthetic silicas, and diatomaceous silica.

Wettable powders will normally contain both a wetter and a dispersant. Most preferred for dry wettable powders are those anionic and nonionic surfactants which exist in solid form. Occasionally a liquid, nonionic surfactant, normally considered an emulsifying agent can be used to produce both wetting and dispersion.

Wetting and dispersing agents in wettable powders of this invention, when taken together, will comprise from about 0.5 weight percent to 5.0 weight percent of the total composition. The active component will be present at a concentration of from about 2% to 80% and diluent makes up the balance to 100%. Where needed a corrosion inhibitor or foaming inhibitor may be added at rates of 0.1% to 1.0% with a corresponding reduction in diluent.

(B) Dusts

Dust compositions are those intended for application to foliage, seed, or soil in dry form with suitable dusting equipment. Since wind drift is undesirable when applying dusts, the most suitable dust diluents are those which are dense and rapid settling. These include talcs, pyrophyllites, ground phosphate rock, serecite, and ground tobacco stems. However, dusts are usually most easily prepared by diluting an existing high-strength wettable powder with a dense diluent so that the final dust will frequently contain a fraction of light, absorptive diluent as well as the more desirable dense filler.

A wetting agent is desirable in dust formulations so that adhesion to dew-covered foliage is enhanced. Dusts made from wettable powders will usually contain sufficient wetter, but dusts made directly from unformulated active will usually contain an added wetting agent. Dry solid anionic or nonionic wetters are preferred.

Dust formulations will normally contain from 1.0 weight percent to 25 weight percent of active material, up to 1.0% wetting agent, and up to 20% light grinding aid diluent and the balance dense, rapid settling diluent. If made by diluting a prepared wettable powder it will also contain a small amount of dispersing agent which has no active role when the composition is used as a dry dust.

(C) Emulsifiable liquids

Emulsifiable liquids are formulated by combining the compound of this invention with a suitable emulsifier and an organic liquid with low water solubility. The active component may be completely dissolved in the organic liquid or it may be a finely ground suspension in a non-solvent liquid. Suitable organic liquids include alkylated naphthalenes, xylene, high molecular weight ketones such as isophorones, dibutyl or diamyl ketone, esters such as amyl acetate and normal or iso paraffins. Most preferred emulsifiers are blends of oil soluble sulfonates and non-ionic polyoxyethylene glycol esters or ethers of fatty acids or alkylated phenols.

The active component in emulsifiable concentrates will be present at from 10 weight percent to about 40 weight percent. Combined emulsifiers will be present at from 3 weight percent to about 10 weight percent and the balance will be an organic carrier liquid or solvent.

(D) Granules

Soil treatments with this material can frequently be most readily applied with granules. Granular products with the compound of this invention can be made in a number of ways. The active material can be melted or dissolved in a carrier and sprayed upon preformed granules. It may be mixed as a powder with suitable diluents and binders, then moistened and granulated followed by drying. Powders may also be applied to preformed granules, for example by tumbling together and applying some nonvolatile liquid such as oil, glycol or a liquid nonionic surfactant to act as a binder, or by also adding a water-soluble powder such as sugar or lignin sulfonates and then water. Rates of granule disintegration and dispersion of active material in moist soil can be controlled by choice of added surfactants or selection of the binders used to form the granule.

Suitable preformed granules include those made from attapulgite clay, granular, expanded vermiculate, or ground corn cobs. When 2-fluoro - 3 - phenyl - 2 - cyclobutenone is placed upon such carriers the concentration may range from 1% to 25%. However, unless applied as a solution or from a molten state, it is difficult to prevent segregration of active and carrier in concentration ranges above about 10% on preformed granules. When higher concentrations of active are desired best results are obtained by premixing powdered active, diluents, binders and surfactants then granulating so that the active is distributed throughout the granule and not solely upon its surface.

Suitable diluents for the preparation of granules by granulation or extrusion include nonswelling CaMg montmorrillonites, and gypsum. Cohesion to a firm granule is usually obtained by moistening, compacting and drying, with or without some binding agent. CaMg bentonites require no binder, and gypsum can be made to form firm granules with either the addition of plaster of Paris or certain salts such as ammonium sulfate, potassium sulfate or urea which form double salts with gypsum.

The active content of formed granules can range from 1–90% although 75% active represents about the upper level if controlled disintegration of the granule in moist soil is desired. Control of disintegration rate is attained by controlled compaction, e.g. controlled extrusion pressure and by the addition of inert water soluble components such as sodium sulfate which can leach away.

(E) Aqueous suspensions

The compound of this invention can also be formulated as a finely divided suspension in water. Such compositions contain from about 10% to about 50% active ingredient, up to about 5% of a suspending agent such as bentonites, hydrated attapulgites and sodium polyacrylates, plus dispersing agents, bactericides, etc. For optimum properties such formulations are prepared by fine grinding the mixture as in a ball- or sandmill.

While conventional applications of sprayable formulations have usually been made in a dilute form (for example, at a rate of about 200 liters per hectare or more), the compounds of this invention can also be applied at higher concentrations in the typical "ultra-low-volume" (ULV) or "low-volume" applications from aircraft or ground sprayers. For this purpose wettable powders can be dispersed in small amounts of aqueous or non-aqueous carrier. The suspension for emulsifiable concentrates can be used directly or with minor dilution. Special compositions, particularly suitable for ULV applications are solutions of finely divided suspensions in one or more carriers such as dialkylformamides, N-alkylpyrrolidones, dimethylsulfoxide, water, esters, ketones, glycols, glycol ethers and the like. Other suitable carriers include aromatic hydrocarbons (halogenated and non-halogenated), aliphatic hydrocarbons (halogenated and non - halogenated) and the like.

In order that the invention may be better understood, the following examples are given:

EXAMPLE 1

Wettable powders: Percent
 2-fluoro-3-phenyl-2-cyclobutenone _____ 40
 Alkylnaphthalenesulfonic acid, sodium salt ___ 1
 Low viscosity methylcellulose _____ 0.5
 Attapulgite clay _____ 58.5

The ingredients are combined, mixed, hammer milled, air milled and then blended. The resulting powder wets and disperses readily in water and is suitable for application in normal spray equipment.

Five kilograms of the above formulation is suspended in 100 liters of water and sprayed to one hectare of cucumber preemergence. The treatment causes an increase in height of the plant, increased length of internodes, increase in fruit size and yield of fruit when compared to a similar untreated plot.

EXAMPLE 2

Percent
2-fluuoro-3-phenyl-2-cyclobutenone _____ 50
Dioctylsulfosuccinate sodium salt _____ 1
Sodium ligninsulfonate _____ 1
Diatomaceous silica _____ 48

The materials are combined, air milled twice and then blended.

Four kilograms of the above formulation is suspended in 400 liters of water and sprayed to runoff to one hectare of tomato when 50% of the flowers of the first cluster are open and the plants are approximately 40 cm. in height. The treatment results in an increase in the total fruit set per plant when compared to the untreated control. The treatment also causes an increase in fruit size and yield.

EXAMPLE 3

Percent
2-fluoro-3-phenyl-2-cyclobutenone _____ 60
Alkylbenzenesulfonic acid sodium salt _____ 1
Sodium ligninsulfonate _____ 1
Diatomaceous silica _____ 28
Fine silica _____ 10

The materials are combined, hammer milled, air milled and then blended.

Eight kilograms of the above formulation is suspended in 400 liters of water and sprayed to one hectare of corn at the early silking-out stage of development. The treatment results in the production of larger ears with an increase in the number of kernels per ear when compared to a similar untreated plot.

Granules: Percent
 2-fluoro-3-phenyl-2-cyclobutenone _____ 10
 Calcium, magnesium bentonite _____ 90

The powdered, active material and bentonite are combined, moistened, granulated, dried and then screened to make 20–80 mesh mixture (0.18–0.84 mm.).

Twenty-five kilograms per hectace of the above preparation is drilled two inches below a seeded crop of soybeans. The treatment results in an increase in plant height, flowering, fruit set and fruit yield when compared to a similar untreated plot.

Dust: Percent
 2-fluoro-3-phenyl-2-cyclobutanone _____ 5
 Attapulgite clay _____ 10
 Talc _____ 85

The active material and clay are combined and ground and then mixed with the talc and blended.

Dormant apple cuttings 15 cm. in length from wood of the previous season's growth are treated with the ingredients of the above formulation. The base of the cuttings are dipped into the chemical preparation and planted immediately in a box of moist sand. The treatment results in an increase in the percentage of cuttings which formed roots, hastens root initiation, and increases the number of roots produced per cutting when compared to the untreated control.

Oil dispersion: Percent
 2-fluoro-3-phenyl-2-cyclobutenone _____ 25
 Blend of polyalcohol carboxylic acid esters and sulfonated oils _____ 8
 Isoparaffinic oils _____ 67

The dispersion is prepared by mixing the ingredients and sandmilling the mixture. The resulting dispersion can be sprayed as a concentrate, diluted with oil or emulsified in water and then applied.

Four kilograms of the above formulation is suspended in 400 liters of water and sprayed to runoff on Chemin Blanc grape vines at the time of anthesis. The treatment causes an increase in fruit set and fruit size when compared to a similar untreated plot.

I claim:
1. The method of stimulating plant growth which comprises applying a physiologically effective amount of a compound, 2-fluoro-3-phenyl-2-cyclobutenone, to the locus of the plant to be stimulated.
2. The method of claim 1 wherein the compound is applied pre-emergence in soil.
3. The method of claim 1 wherein the compound is applied directly to foliage of growing plants.
4. The method of claim 1 wherein the compound is applied to plant seeds.
5. The method of claim 1 wherein the compound is applied to cuttings to stimulate root formation.
6. The method of claim 1 wherein the plants are agricultural and agricultural productivity is increased.
7. The method of claim 6 wherein the compound is applied pre-emergence to cucumbers.

8. The method of claim 6 wherein the compound is applied to tomato plants after flower opening begins to provide greater fruit set, improved yield, and greater fruit size.

9. The method of claim 6 wherein the compound is applied to corn plants during early silking stage.

10. The method of claim 6 wherein the compound is applied to soybean plants.

11. The method of claim 10 wherein the compound is applied pre-emergence to soil.

12. The method of claim 5 wherein the compound is applied to apple twigs to stimulate rooting.

13. The method of claim 6 wherein the compound is applied to grape vines at times of anthesis to increase fruit set and fruit size.

References Cited

UNITED STATES PATENTS 2,435,499  2/1948  Ladd _____ 71—77

OTHER REFERENCES

Silversmith et al., Small Ring Compounds etc., J.A.C.S. 80, pp. 5840–45 (1958).

LEWIS GOTTS, Primary Examiner

G. HOLLRAH, Assistant Examiner

U.S. Cl. X.R.

71—123; 260—586 R